US012170051B2

(12) United States Patent
Jung et al.

(10) Patent No.: US 12,170,051 B2
(45) Date of Patent: Dec. 17, 2024

(54) SOURCE DRIVER INTEGRATED CIRCUIT, METHOD OF DRIVING THE SAME, AND TIMING CONTROLLER

(71) Applicant: LX SEMICON CO., LTD., Daejeon (KR)

(72) Inventors: Hee Yoon Jung, Daejeon (KR); Woong Jin Oh, Daejeon (KR); Jung Min Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/517,676

(22) Filed: Nov. 22, 2023

(65) Prior Publication Data

US 2024/0169887 A1 May 23, 2024

(30) Foreign Application Priority Data

Nov. 23, 2022 (KR) ........................ 10-2022-0157896

(51) Int. Cl.
*G09G 3/20* (2006.01)
*G09G 3/3275* (2016.01)

(52) U.S. Cl.
CPC ......... *G09G 3/2096* (2013.01); *G09G 3/3275* (2013.01); *G09G 2310/0243* (2013.01);
(Continued)

(58) Field of Classification Search
CPC ..... G09G 2330/021; G09G 2310/0291; G09G 2310/0286; G09G 2310/0243; G09G 3/3275; G09G 3/2096
See application file for complete search history.

(56) References Cited

U.S. PATENT DOCUMENTS

2010/0045655 A1 2/2010 Jang et al.
2012/0146965 A1* 6/2012 Baek ...................... G09G 3/006 345/204

(Continued)

FOREIGN PATENT DOCUMENTS

KR 10-2098010 B1 4/2020

OTHER PUBLICATIONS

Extended European Search Report dated Apr. 5, 2024, issued for the corresponding European patent application EP 23211773.9, 12 pages.

*Primary Examiner* — Abbas I Abdulselam
(74) *Attorney, Agent, or Firm* — ROTHWELL, FIGG, ERNST & MANBECK, P.C.

(57) ABSTRACT

A source driver IC capable of cancelling an output offset is provided. The source driver IC comprises a reception circuit configured to receive an input data packet from a timing controller when operating in a normal mode and obtain an image data and a first clock signal from the input data packet, a control circuit configured to receive and output the image data and the first clock signal from the reception circuit when operating in the normal mode. The control circuit is configured to receive and output a second clock signal from the timing controller when operating in a low power mode. The source driver IC further comprises an output buffer circuit configured to output a data voltage related to the image data when operating in the normal mode and maintain an output of the data voltage when operating in the low power mode.

20 Claims, 9 Drawing Sheets

(52) U.S. Cl.
CPC ............... *G09G 2310/0286* (2013.01); *G09G 2310/0291* (2013.01); *G09G 2330/021* (2013.01); *G09G 2370/10* (2013.01)

(56) References Cited

U.S. PATENT DOCUMENTS

| | | | | |
|---|---|---|---|---|
| 2012/0256660 | A1 | 10/2012 | Huang et al. | |
| 2015/0255042 | A1 | 9/2015 | Oh et al. | |
| 2016/0063962 | A1 | 3/2016 | Park et al. | |
| 2016/0225327 | A1* | 8/2016 | Jang ..................... | G09G 3/3413 |
| 2017/0124957 | A1 | 5/2017 | Ahn et al. | |

* cited by examiner

SOURCE DRIVER INTEGRATED CIRCUIT, METHOD OF DRIVING THE SAME, AND TIMING CONTROLLER

Pursuant to 35 U.S.C. § 119(a), this application claims the benefit of earlier filing date and right of priority to Korean Application No. 10-2022-0157896, filed on Nov. 23, 2022, the contents of which are hereby incorporated by reference herein in their entirety.

BACKGROUND OF THE DISCLOSURE

Field of the Disclosure

The present disclosure relates to a display device, and more particularly, to driving a source driver Integrated Circuit (IC).

Discussion of the Related Art

As the information society develops, the demands for display devices that display images are increasing in various forms. According to these demands, various types of display devices such as Organic Light Emitting Diodes (OLED) display devices well as the existing Liquid Crystal Display (LCD) devices are utilized.

Such a display device includes a source driver Integrated Circuit (IC) to supply data voltages to data lines of a display panel, a gate driver IC to supply gate pulses (or scan pulses) sequentially to gate lines (or scan lines) of the display panel, a timing controller to control the source driver IC and the gate driver IC, and the like.

In this case, the display device may include a plurality of source driver ICs depending on a size of the display panel and the like, and an output offset between the source driver ICs may occur due to an output offset between output buffer circuits included in each of the source driver ICs.

When the source driver IC outputs image data received from the timing controller according to a clock signal, the data voltage for the corresponding image data may be outputted from the output buffer circuit according to the clock signal, so that output offset cancellation between the output buffer circuits of each of the source driver ICs may be achieved.

However, if previous image data is maintained, the timing controller does not transmit image data and clock signals to the source driver IC by turning off a transmission circuit to operate in a low-power mode, so the output buffer circuit of the source driver IC may maintain the output of the data voltage for the previous image data, but cannot receive the clock signal from the timing controller, thereby failing to perform the output offset cancellation, which may cause a problem that an output offset may be generated between the respective source driver ICs.

SUMMARY OF THE DISCLOSURE

Accordingly, the present disclosure substantially obviates one or more problems due to limitations and disadvantages of the related art. One object of the present disclosure is to provide a source driver IC capable of cancelling an output offset of the source driver IC by receiving a separate clock signal from a timing controller when operating in a low power mode, method of driving the same, and timing controller thereof.

Another object of the present disclosure is to provide a source driver IC capable of receiving a clock signal through an EPI line from a timing controller when operating in a low power mode, method of driving the same, and controller thereof.

Further object of the present disclosure is to provide a source driver IC capable of receiving a clock signal of a first voltage level from a timing controller and boosting it to a clock signal of a second voltage level higher than the first voltage level, method of driving the same, and controller thereof.

To achieve these objects and other advantages and in accordance with the purpose of the disclosure, as embodied and broadly described herein, a source driver Integrated Circuit (IC) according to one aspect of the present disclosure may include a reception circuit configured to receive an input data packet from a timing controller when operating in a normal mode and obtain an image data and a first clock signal from the input data packet, a control circuit configured to receive and output the image data and the first clock signal from the reception circuit when operating in the normal mode, the control circuit configured to receive and output a second clock signal from the timing controller when operating in a low power mode, and an output buffer circuit configured to output a data voltage related to the image data when operating in the normal mode and maintain an output of the data voltage when operating in the low power mode, wherein the output buffer circuit may be configured to output the data voltage according to the first clock signal when operating in the normal mode and output the data voltage according to the second clock signal when operating in the low power mode.

To achieve these objects and other advantages and in accordance with the purpose of the disclosure, as embodied and broadly described herein, a timing controller according to another aspect of the present disclosure may include a transmission circuit configured to output an input data packet including an image data and a first clock signal to a source driver Integrated Circuit (IC) through an interface of a pre-determined type when operating in a normal mode and be turned off when operating in a low power mode and a timing generation circuit configured to generate and output a second clock signal to the source driver IC when operating in the low power mode.

To achieve these objects and other advantages and in accordance with the purpose of the disclosure, as embodied and broadly described herein, a method of driving a source driver Integrated Circuit (IC) according to further aspect of the present disclosure may include receiving an input data packet from a timing controller and obtaining an image data and a first clock signal from the input data packet by a reception circuit during a normal mode interval, receiving and outputting the image data and the first clock signal from the reception circuit by a control circuit during the normal mode interval, amplifying and outputting a data voltage related to the image data by an output buffer circuit according to the first clock signal during the normal mode interval, receiving and outputting a second clock signal from the timing controller by the control circuit during a low power mode interval, and outputting the data voltage used to be outputted along the first clock by the output buffer circuit according to the second clock signal during the low power mode interval.

According to the present disclosure, even if the transmission circuit of the timing controller is turned off during the low power mode operation, the output offset of the source driver IC may be cancelled using a clock signal separately generated by the timing controller, so that the output offset between the source driver ICs can be cancelled even during the operation in the low power mode.

In addition, according to the present disclosure, when operating in the low power mode, a clock signal for output offset cancellation between the source driver ICs may be received from the timing controller through the EPI line, thereby simplifying the configuration of the source display device because an additional line for transmission and reception of clock signals is not required separately, which may reduce the manufacturing cost of the display device.

In addition, according to the present disclosure, since the clock signal of the first voltage level is received and boosted into the clock signal of the second voltage level higher than the first voltage level, thereby reducing the noise that may be generated during transmission of the second clock signal.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The present disclosure will become more fully understood from the detailed description given herein below and the accompanying drawings, which are given by illustration only, and thus are not limitative of the present disclosure.

DETAILED DESCRIPTION OF THE DISCLOSURE

Figure 1:
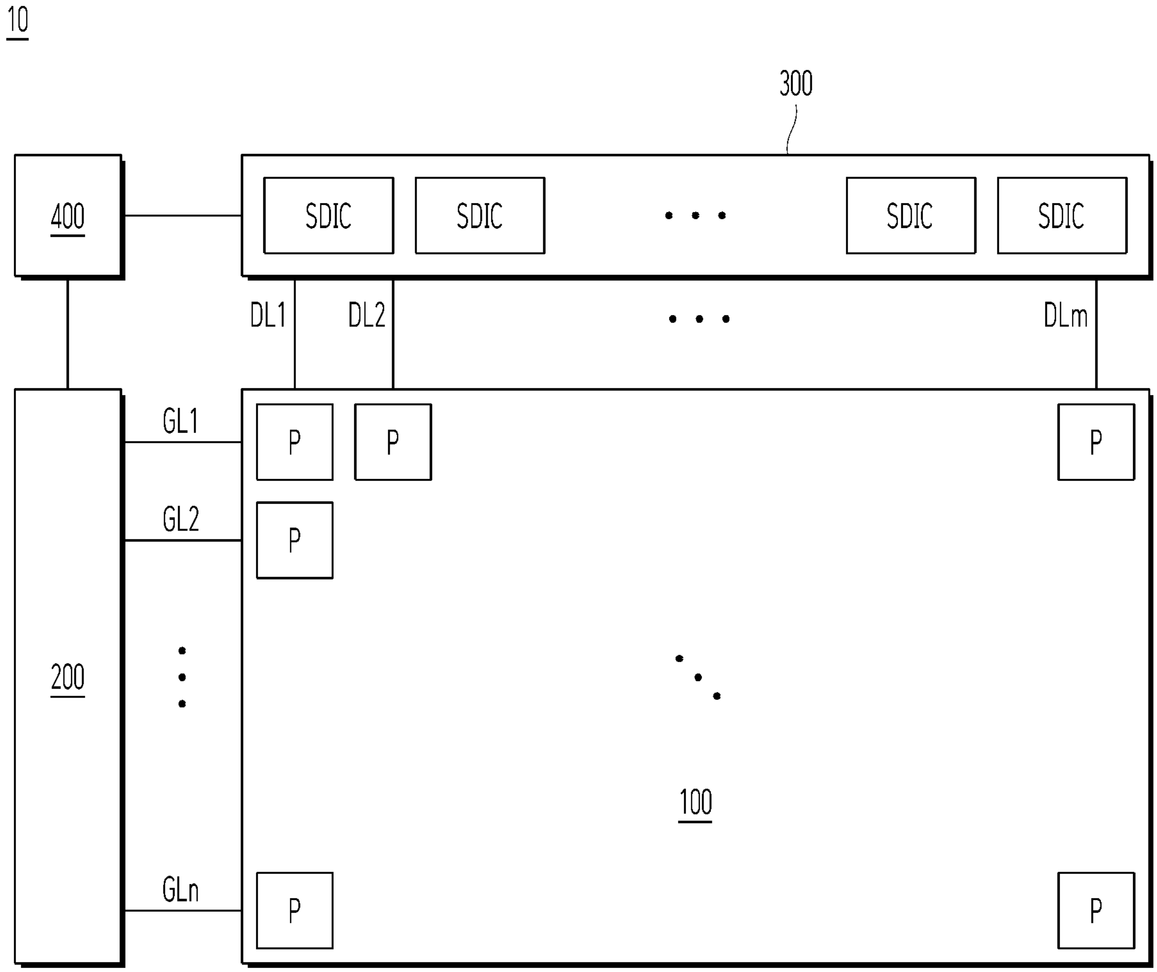
FIG. 1 is a diagram showing a configuration of a display device to which a source driver IC is applied according to one embodiment of the present disclosure.

Throughout the specification, like reference numerals are used to refer to substantially the same components. In the following description, detailed descriptions of components and features known in the art may be omitted if they are not relevant to the core configuration of the present disclosure. The meanings of terms used in this specification are to be understood as follows.

The advantages and features of the present disclosure, and methods of achieving them, will become apparent from the detailed description of the embodiments, together with the accompanying drawings. However, the present disclosure is not limited to the embodiments disclosed herein and will be implemented in many different forms. The embodiments are provided merely to make the disclosure of the present invention thorough and to fully inform one of ordinary skill in the art to which the present disclosure belongs of the scope of the disclosure. It is to be noted that the scope of the present disclosure is defined only by the claims.

The figures, dimensions, ratios, angles, numbers of elements given in the drawings are merely illustrative and are not limiting. Like reference numerals refer to like elements throughout the specification. Further, in describing the present disclosure, descriptions of well-known technologies may be omitted in order to avoid obscuring the gist of the present disclosure.

As used herein, the terms "includes," "has," "comprises," and the like should not be construed as being restricted to the means listed thereafter unless specifically stated otherwise. Where an indefinite or definite article is used when referring to a singular noun e.g. "a" or "an", "the", this includes a plural of that noun unless something else is specifically stated.

Elements are to be interpreted a margin of error, even if not explicitly stated otherwise.

In describing positional relationship, for example, if the positional relationship of two parts is described as 'on ~', 'over ~', 'under ~', 'next to ~', or the like, one or more other parts may be located between the two parts unless 'right' or 'direct' is used.

In describing temporal relationships, terms such as "after," "subsequent to," "next to," "before," and the like may include cases where any two events are not consecutive, unless the term "immediately" or "directly" is explicitly used.

While the terms first, second, and the like are used to describe various elements, the elements are not limited by these terms. These terms are used merely to distinguish one element from another. Accordingly, a first element referred to herein may be a second element within the technical idea of the present disclosure.

"X-axis direction", "Y-axis direction", and "Z-axis direction" should not be construed only as a geometric relationship in which the relationship with each other is vertically formed, but may mean to have wider directionality within the scope in which the configurations of the present disclosure may act functionally.

It should be understood that the term "at least one" includes all possible combinations of one or more related items. For example, the phrase "at least one of the first, second, and third items" can mean each of the first, second, or third items, as well as any possible combination of two or more of the first, second, and third items.

Features of various embodiments of the present disclosure can be partially or fully combined. As will be clearly appreciated by those skilled in the art, various interactions and operations are technically possible. Embodiments can be practiced independently of each other or in conjunction with each other.

Hereinafter, an embodiment of the present disclosure will be described in detail with reference to the accompanying drawings.

FIG. 1 is a diagram showing a configuration of a display device to which a source driver IC is applied according to one embodiment of the present disclosure.

A display device 10 sown in FIG. 1 is an electronic device including a timing controller 400 and a Source driver IC SDIC according to the present disclosure, and may include, for example, various display devices using a voltage of a battery or an external power source as an operating voltage. Specifically, the display device 10 may include a TV, a mobile, a monitor, a laptop, or the like.

Referring to FIG. 1, the display device 10 according to the present disclosure includes a display panel 100, a gate driving device 200 for driving the display panel 100, a source driving device 300, and a timing controller 400.

The display panel 100 includes data lines DL1 to DLm, gate lines GL1 to GLn intersecting the data lines DL1 to DLm, and pixels P arranged in a matrix form defined by the data lines DL1 to DLm and the gate lines GL1 to GLn.

The data lines DL1 to DLm supply data signals (also referred to as data voltages) inputted from the source driving device 300 to the pixels P. The gate lines GL1 to GLn supply gate signals inputted from the gate driving device 200 to the pixels P.

In one embodiment, the display panel 100 according to the present disclosure may include a Liquid Crystal Display (LCD) panel. In this case, each of the pixels P may include at least one switching transistor (TFT), at least one capacitor, and a liquid crystal layer between glass substrates.

In another embodiment, the display panel 100 according to the present disclosure may include an Organic Light Emitting Diode (OLED) display panel.

The gate driving device 200 supplies the gate signal to the pixels P through the gate lines GL1 to GLn. The gate driving device 200 includes a shift register that outputs a gate pulse synchronized with a data signal in response to a gate timing control signal inputted from the timing controller 400.

The gate timing control signal includes a gate start pulse and a gate shift clock. The shift register shifts the gate start pulse according to the timing of the gate shift clock so that the gate pulses are sequentially supplied to the gate lines GL.

Switching transistors respectively included in the pixels P of the display panel 100 are turned on according to the gate pulse to select the data line DL of the display panel 100 to which the data signal is inputted. Here, a shift register included in the gate driving device 200 may be formed directly on the substrate of the display panel 100 in the same process together with a transistor array of a pixel array.

The source driving device 300 supplies a data voltage for an image to be displayed through the display panel 100 to the data lines DL. To this end, the source driving device IC 300 may include a plurality of source driver ICs (SDICs).

A plurality of the source driver ICs (SDICs) included in the source driving device 300 convert per-channel image data (RGB DATA or RGB) inputted from the timing controller 400 into a data voltage of an analog type and supply the converted data voltage to each pixel P of the display panel 100 through the data line DL according to a data timing control signal inputted from the timing controller 400.

The Timing Controller (TCON) 400 controls the operations of the gate driving device 200 and the source driving device 300. In one embodiment, the timing controller 400 may generate a data timing control signal DCS for controlling the operation of the source driving device 300 or a gate timing control signal GCS for controlling the operation of the gate driving device 200 from timing signals including a vertical synchronization signal Vsync, a horizontal synchronization signal Hsync, a clock signal CLK, a data enable signal DE, and the like.

The data timing control signal may include a Source Start Pulse (SSP), a Source Sampling Clock (SSC), a Source Output Enable signal (SOE), and the like, and the gate timing control signal may include a Gate Start Pulse (GSP), a Gate Shift Clock (GSC), a Gate Output Enable signal (GOE), and the like.

Here, the source start pulse controls a data sampling start timing of the source driving device 300. The source sampling clock is a clock signal that controls a sampling timing of data in the source driving device 300. The Source Output Enable signal (SOE) controls an output timing of the data voltage.

The gate start pulse controls an operation start timing of the gate driving device 200. The gate shift clock is a clock signal inputted to the gate driving device 200 and controls a shift timing of the gate pulse. The gate output enable signal designates timing information of the gate driving device 200.

In particular, when operating in a low power mode, the timing controller 400 according to the present disclosure generates a clock signal to cancel an output offset of the source driver IC SDIC and transmits it to the source driver IC SDIC, and the source driver IC SDIC may cancel the output offset of the source driver IC SDIC using the clock signal. Through this, the output offset between the source driver ICs SDIC may be cancelled.

In addition, the timing controller 400 according to this disclosure determines whether a first image data of a first frame inputted externally and a second image data of a second frame consecutive to the first frame are the same or different, thereby determining operation mode of the timing controller 400 and the source driver IC SDIC. Specifically, when the second image data and the first image data are different from each other, the timing controller 400 determines the operation mode of the timing controller 400 and the source driver IC SDIC as a normal mode. In addition, the timing controller 400 determines the operation mode of the timing controller 400 and the source driver IC SDIC as a low power mode when the second image data is the same as the first image data. The timing controller 400 transmits a clock signal for cancelling the output offset of the source driver IC SDIC to the source driver IC SDIC when determining the operation mode of the timing controller 400 and the source driver IC SDIC as the low power mode. The source driver IC SDIC may cancel the output offset using the clock signal transmitted from the timing controller 400 even if operating in the low power mode.

In one embodiment, the timing controller 400 may transmit a clock signal for cancelling the output offset of the source driver IC SDIC to the source driver IC SDIC through a separate line or to the source driver IC SDIC through an existing EPI interface line.

In addition, when the operation mode of the timing controller 400 and the source driver IC SDIC is determined as the low power mode, the timing controller 400 according to the present disclosure may include an operation mode setting bit for enabling the source driver IC 400 to operate in the low power mode in an input data packet and transmit it to the source driver IC SDIC. The source driver IC SDIC decodes a value of the operation mode setting bit to determine whether to operate in the low-power mode. When it is determined to operate in the low power mode, the source driver IC SDIC may cancel the output offset of the source driver IC using the clock signal transmitted from the timing controller 400.

Hereinafter, the characteristics of a source driver IC SDIC and a timing controller 400 according to the present disclosure n will be described in more detail with reference to FIGS. 2 to 8.

In the following description, it is assumed that a timing controller 400 and a source driver IC 300 are connected through an interface of an Embedded Clock Point-to-Point Interface (EPI) type or an interface of a Clock Embedded Differential Signaling (CEDS) type, but the source driver IC SDIC and the timing controller 400 may be connected through various types of interfaces without being limited thereto.

Figure 2:
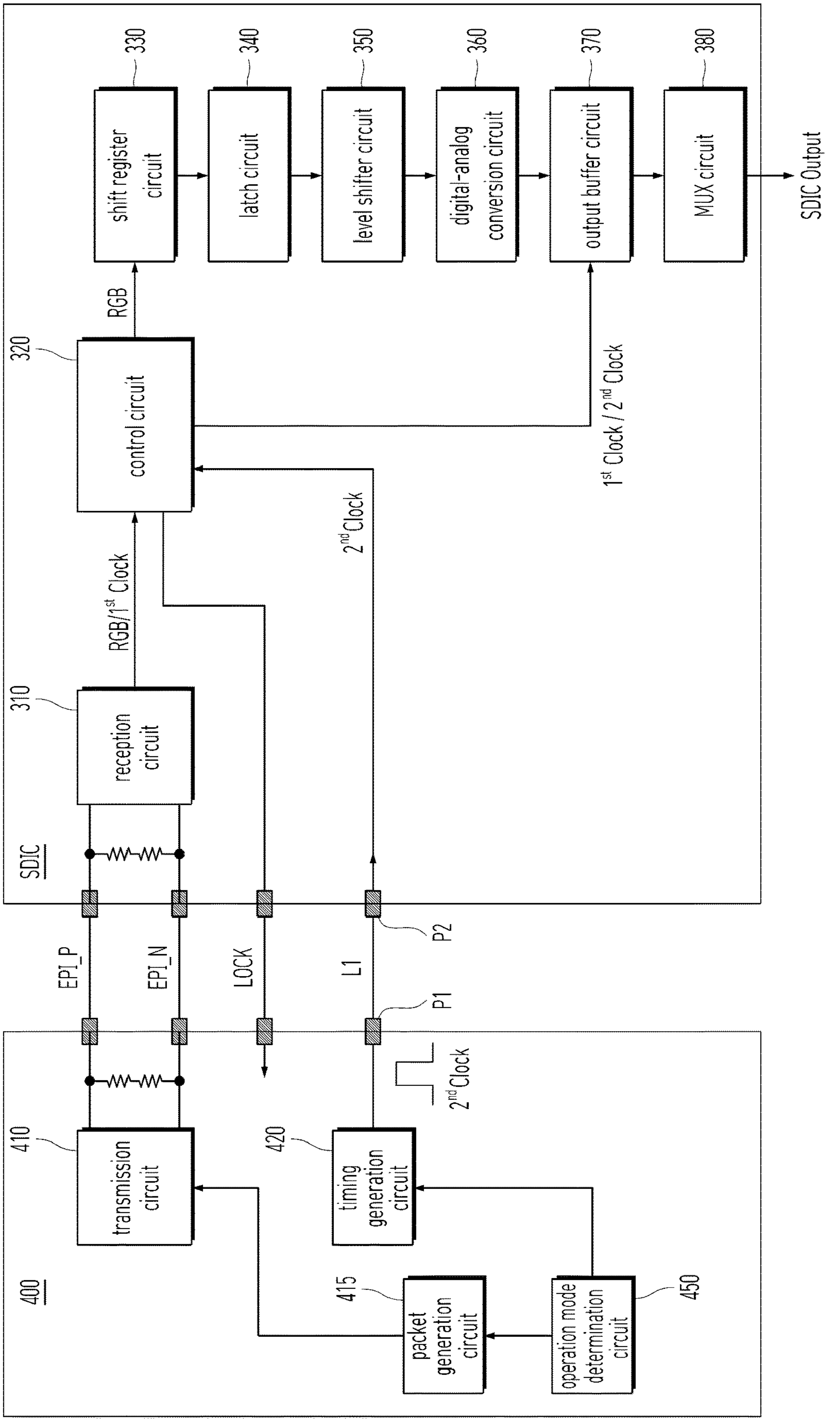
FIG. 2 is a block diagram schematically showing the configuration of a source driver IC and a timing controller according to a first embodiment of the present disclosure.

FIG. 2 is a block diagram schematically showing the configuration of a source driver IC and a timing controller according to a first embodiment of the present disclosure.

Referring to FIG. 2, a timing controller 400 according to a first embodiment of the present disclosure includes a transmission circuit 410, a packet generation circuit 415, a timing generation circuit 420, and an operation mode determination circuit 450.

When an operation mode of the timing controller 400 is determined as a normal mode by the operation mode determination circuit 450, the transmission circuit 410 outputs an input data packet (e.g., a packet according to the EPI system) generated by the packet generation circuit 415 to a source driver IC SDIC through an EPI interface EPI_P and EPI_N. The transmission circuit 410 is turned off when the operation mode of the timing controller 400 is determined as a low power mode by the operation mode determination circuit 450. Therefore, since the transmission circuit 410 does not transmit image data and a first clock signal 1st Clock to the source driver IC SDIC when operating in the low power mode, the power consumption of the timing controller 400 may be reduced.

In one embodiment, the transmission circuit 410 may transmit an input data packet in the form of a differential signal through a pair of a first EPI line EPI_P and a second EPI line EPI_N.

When the operation mode of the timing controller 400 is determined as the normal mode by the operation mode determination circuit 450, the packet generation circuit 415 generates an input data packet including image data and a first clock signal 1st Clock for the operation of the source driver IC SDIC. The packet generation circuit 415 outputs the input data packet to the transmission circuit 410.

In one embodiment, the input data packet may include a preamble packet, a control packet including a first clock signal 1st Clock, and an image data (RGB) packet.

In this case, the packet generation circuit 415 may additionally include an operation mode setting bit, which is provided to operate the source driver IC 400 in the low power mode, in the input data packet. For example, when the operation mode of the timing controller 400 is determined as the low power mode by the operation mode determination circuit 450, the packet generation circuit 415 may include an operation mode setting bit having a first value (e.g., "0") in the input data packet. When the operation mode of the timing controller 400 is determined as the normal mode by the operation mode determination circuit 450, the packet generation circuit 415 may include an operation mode setting bit having a second value (e.g., "1") in the input data packet.

When the operation mode of the timing controller 400 is determined as the low power mode by the operation mode determination circuit 450, the timing generation circuit 420 generates a second clock signal 2nd Clock for output offset cancellation of the source driver IC SDIC and outputs it to the source driver IC SDIC. In one embodiment, the second clock signal 2nd Clock may be a PWM signal having a second voltage level. In this case, the second voltage level may be a voltage level of a system power source used for operations of internal circuits of the source driver IC SDIC.

In one embodiment, the timing controller 400 may include a separate first pin P1 for transmission of the second clock signal 2nd Clock, and the timing generation circuit 420 may transmit the second clock signal 2nd Clock to the source driver IC SDIC through the first pin P1.

The operation mode determination circuit 450 determines the operation mode of the timing controller 400 and the source driver IC SDIC by comparing a first image data of a first frame with a second image data of a second frame consecutive to the first frame. Specifically, when the first image data and the second image data are the same, the operation mode determination circuit 450 determines the operation mode of the timing controller 400 and the source driver IC SDIC as the low power mode.

A source driver IC SDIC according to the first embodiment of the present disclosure includes a reception circuit 310, a control circuit 320, a shift register circuit 330, a latch circuit 340, a level shifter circuit 350, a digital-to-analog conversion circuit 360, an output buffer circuit 370, and a MUX circuit 380.

The reception circuit 310 receives an input data packet including an image data RGB and a first clock signal 1st Clock from the timing controller 400 when operating in the normal mode. In one embodiment, the reception circuit 310 may receive an input data packet including a preamble packet, a control packet including a first clock signal, and an image data (RGB) packet. In this case, the input data packet may additionally include various control signals for controlling the operation of the source driver IC SDIC.

In particular, the reception circuit 310 may check an operation mode setting bit included in the input data packet to determine whether the source driver IC SDIC will operate in a low power mode or in a normal mode in a next frame. For example, if the input data packet includes an operation mode setting bit having a first value, the reception circuit 310 may determine to operate in the low power mode in the next frame. If the input data packet includes an operation mode setting bit having a second value, the reception circuit 310 may determine to operate in the normal mode in the next frame. According to the first embodiment, the reception circuit 310 may maintain a turned-on state while operating in the low power mode.

The control circuit 320 receives an image data RGB and a first click signal 1st Clock from the reception circuit 310 and outputs them when operating in the normal mode. The control circuit 320 receives a second clock signal 2nd Clock for cancelling an output offset from the timing controller 400 and outputs them when operating in low power mode.

In one embodiment, the source driver IC SDIC may include a second pin P2 for receiving the second clock signal 2nd Clock from the timing controller 400, and the control circuit 320 may receive the second clock signal 2nd Clock from the timing controller 400 through the second pin P2. In this case, the second pin P2 may be connected to the first pin P1 of the timing controller 400 through a separate control line L1.

As described above, when the second clock signal 2nd Clock has a second voltage level that is the voltage level for an internal circuit operation of the source driver IC SDIC, the control circuit 320 does not need to boost the voltage level of the second clock signal 2nd Clock, and thus the logic implementation of the control circuit 320 may be simplified.

Figure 3:
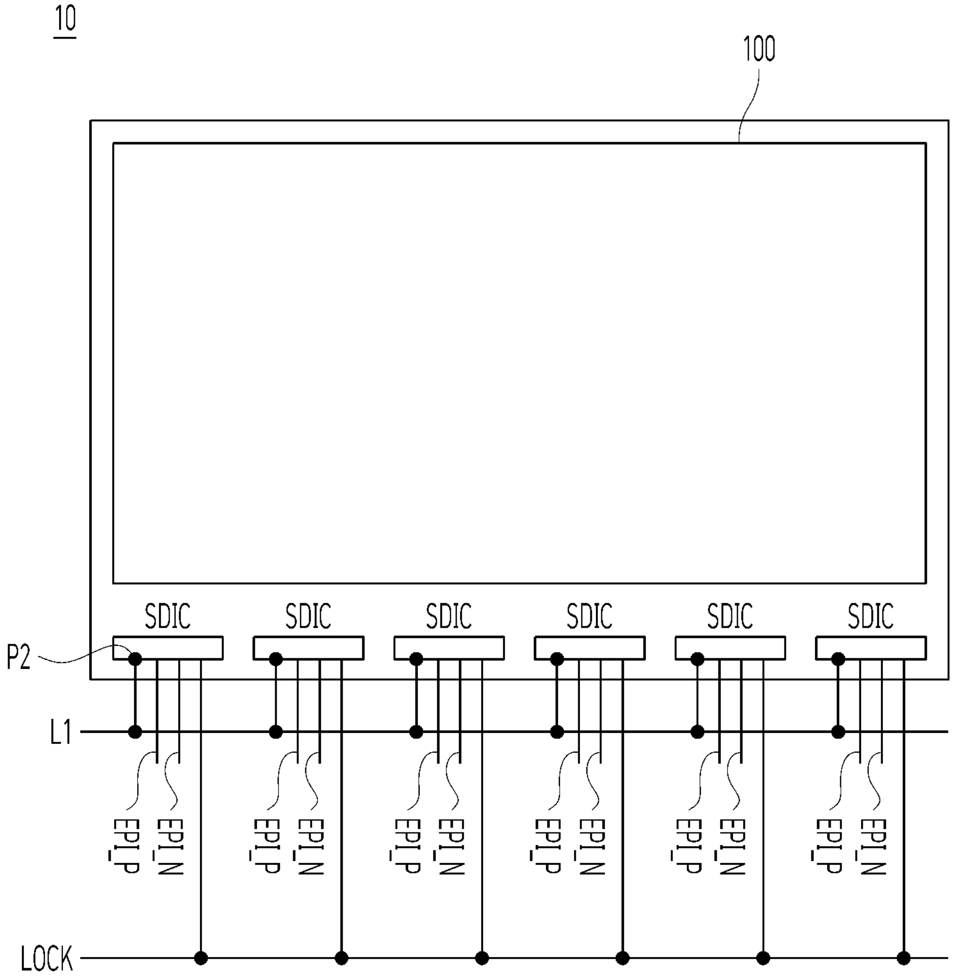
FIG. 3 is a diagram showing an example of an interface line between the source driver IC and the timing controller shown in FIG. 2.

FIG. 3 is a diagram showing an example of an interface line between the source driver IC and the timing controller shown in FIG. 2.

As shown in FIG. 3, a display device 10 may include a plurality of source driver ICs SDIC, and each of the source driver ICs SDIC may be connected to a timing controller (not shown) through a first EPI line EPI_P, a second EPI line EPI_N, a lock line (LOCK), and a control line L1 for transmission and reception of a second clock signal 2nd Clock. In addition, the first EPI line EPI_N and the second EPI line EPI_P may connect the timing controller and the source driver IC SDIC in a 1:1 manner, and the lock line LOCK and the control line L1 may connect the timing controller and n source driver ICs SDIC in a 1:N manner.

Referring back to FIG. 2, the shift register circuit 330 is composed of a plurality of shift registers (not shown). Each of the shift registers included in the shift register circuit 330 sequentially shifts a Source Start Pulse (SSP) using a Source Sampling Clock (SSC) and inputs it to the latch circuit 340.

When operating in the normal mode, the latch circuit 340 latches an image data outputted from the control circuit 320 and outputs it to the level shifter circuit 350. To this end, the latch circuit 340 may include a first latch circuit (not shown) and a second latch circuit (not shown). The first latch circuit may be composed of a plurality of sampling latches (not shown). A plurality of the sampling latches included in the first latch circuit sample the image data RGB inputted in series from the control circuit 320 in synchronization with the Source Start Pulse (SSP) inputted from the shift register circuit 320 connected to each of the sampling latches.

The second latch circuit may be composed of a plurality of holding latches (not shown). Each of the holding latches included in the second latch circuit latches an image data outputted for each channel from the first latch circuit and then outputs it to the level shifter circuit 350.

The level shifter circuit 350 may include a plurality of level shifters (not shown). Each of the level shifters included in the level shifter circuit 350 shifts the voltage level of the image data outputted from the second latch circuit to a predetermined voltage level when operating in the normal mode.

The digital-analog conversion unit 360 converts the per-channel image data whose voltage level has been shifted into an analog data voltage using a reference gamma voltage generated by a gamma voltage generation circuit (not shown) when operating in the normal mode.

In one embodiment, the shift register circuit 330, the latch circuit 340, the level shifter circuit 350 and the digital-to-analog conversion circuit 360 described above may be turned off when operating in the low power mode.

The output buffer circuit 370 amplifies the data voltage outputted from the digital-to-analog conversion circuit 360 when operating in the normal mode and then outputs it according to the first clock signal 1st clock outputted from the control circuit 320 or an internal clock signal (hereinafter first clock signal 1st Clock) generated based on the first clock signal 1st Clock. In this way, the output buffer circuit 370 may cancel the output offset of the output buffer circuit 370 by toggling the data voltage according to the first clock signal 1st Clock when operating in the normal mode, thereby cancelling the output offset between the source driver ICs SDIC.

Meanwhile, the output buffer circuit 370 maintains an output of a data voltage with respect to an image data of a previous frame when operating in the low power mode. In the case of a typical source driver IC (SDIC), since the first clock signal 1st Clock is not received from the timing controller 400 when operating in the low power mode, the data voltage of the previous frame is inevitably outputted without being toggled, resulting in an offset in the outputs between the source driver ICs SDIC due to an output offset difference between the output buffer circuits 370 of the source driver ICs (SDIC).

On the contrary, since the output buffer circuit 370 of the present disclosure may receive the second clock signal 2nd Clock from the control circuit 320 even when operating in the low power mode, the data voltage of the previous frame is toggled according to a second clock signal 2nd Clock or an internal clock signal (hereinafter, a second clock signal 2nd Clock) generated based on the second clock signal 2nd Clock, and thus, an output offset difference between the output buffer circuits 370 of the source driver ICs (SDIC) may be eliminated, and thus an output offset between the source driver ICs (SDIC) may be cancelled.

The MUX circuit 380 outputs the data voltage outputted through the output buffer circuit 370 to a pixel of the display panel 100 through a data line DL. In one embodiment, the MUX circuit 380 may consist of a plurality of switching elements (not shown), and control the switching elements to select a data line DL to which the data voltage is to be outputted.

Figure 4:
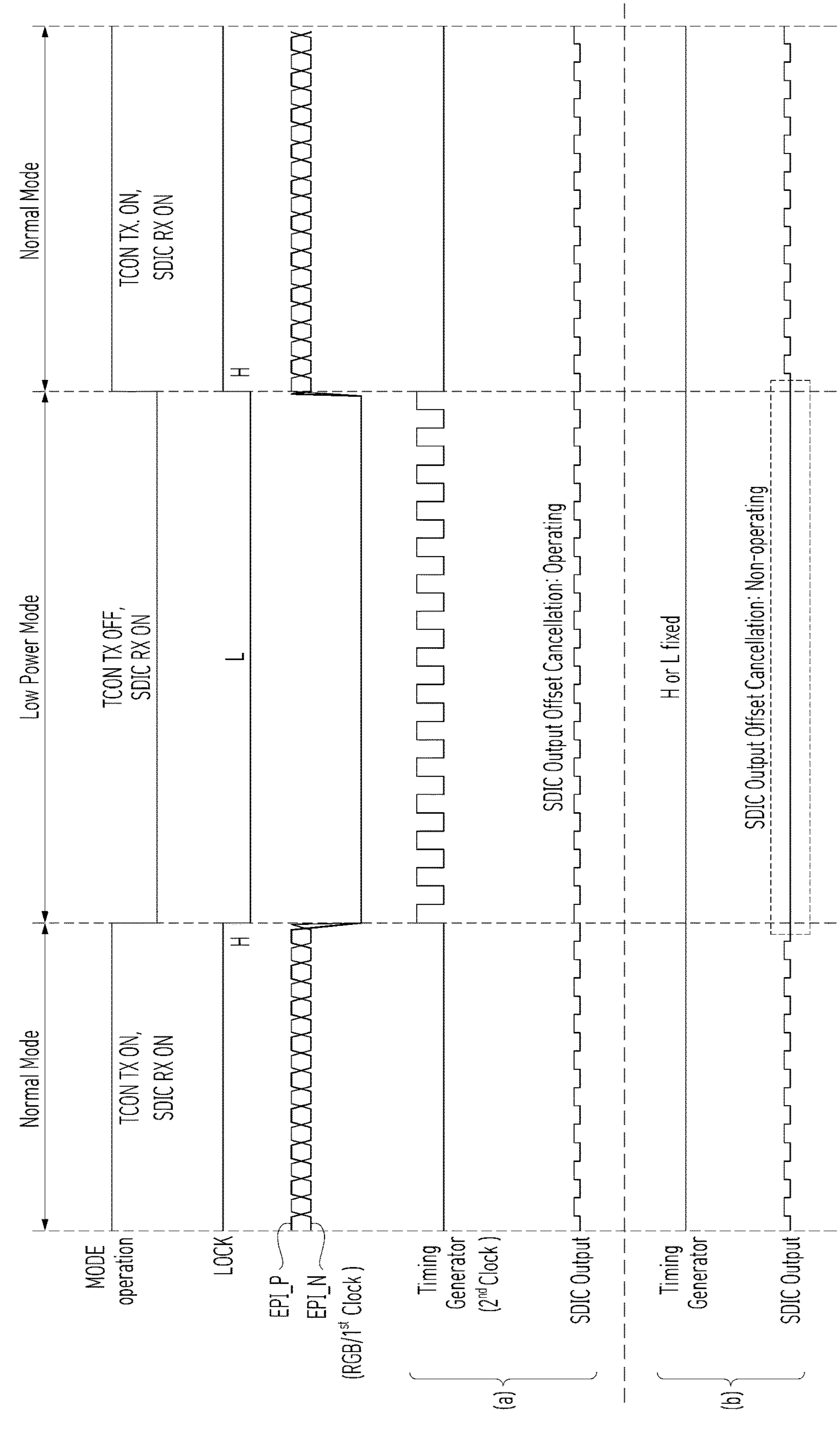
FIG. 4 is a timing diagram to describe operations of the source driver IC and the timing controller shown in FIG. 2.

FIG. 4 is a timing diagram to describe operations of the source driver IC and the timing controller shown in FIG. 2.

As shown in FIG. 4, the source driver IC SDIC and the timing controller 400 according to the first embodiment of the present disclosure may operate in any one of a normal mode and a low power mode. Hereinafter, a time interval in which the timing controller operates in the normal mode will be referred to as a normal mode interval, and a time interval in which the timing controller operates in the low power mode will be referred to as a low power mode interval.

FIG. 4 (*a*) is a diagram showing an example of an output SDIC Output of the source driver IC SDIC when a timing generation circuit Timing Generator outputs a second clock signal 2nd Clock during the low-power mode interval according to the present disclosure. FIG. 4 (*b*) shows an example of an SDIC output of the source driver IC SDIC when the timing generation circuit Timing Generator does not output the second clock signal 2nd Clock during the low power mode interval.

During the normal mode interval, a transmission circuit TX of the timing controller TCON and a reception circuit RX of the source driver IC SDIC are turned on, and the timing generation circuit Timing Generator does not output the second clock signal 2nd Clock. In addition, an image data RGB and a first clock signal 1st Clock may be transmitted in opposite phases through a first EPI line EPI_P and a second EPI line EPI_N. In addition, since an output (i.e., data voltage) of the source driver IC SDIC is toggled according to the first clock signal 1st Clock, it can be seen that an SDIC Output Offset Cancellation operation of the source driver IC SDIC may be performed.

Meanwhile, during the low power mode interval, the transmission circuit TX of the timing controller TCON is turned off, but the reception circuit RX of the source driver IC SDIC is turned on. In doing so, as shown in FIG. 4 (*a*), the image data RGB and the first clock signal 1st Clock are not transmitted through the first EPI line EPI_P and the second EPI line EPI_N, but the timing generation circuit Timing Generator outputs the second clock signal 2nd Clock to the source driver IC SDIC. Therefore, since the output SDIC Output of the source driver IC SDIC used to be toggled according to the first clock signal 1st Clock is toggled according to the second clock signal 2nd Clock, the SDIC Output Offset Cancellation operation of the source driver IC SDIC may be performed.

On the other hand, as shown in FIG. 4 (*b*), if the timing generation circuit Timing Generator does not generate and output a second clock during the low power mode interval, the output SDIC Output of the source driver IC SDIC is not toggled, so SDIC Output Offset Cancellation of the source driver IC SDIC may not be performed, which inevitably causes an output offset between source driver ICs SDICs.

As described above, according to the present disclosure, when the timing controller 400 and the source driver IC SDIC operate in the low power mode, even if the transmission circuit TX of the timing controller 400 is turned off, the timing generation circuit 420 generates a separate second clock signal 2nd Clock and transmits it to the source driver IC SDIC, so that the source driver IC SDIC may cancel the output offset of the source driver IC SDIC by using the second clock signal 2nd Clock.

Figure 5:
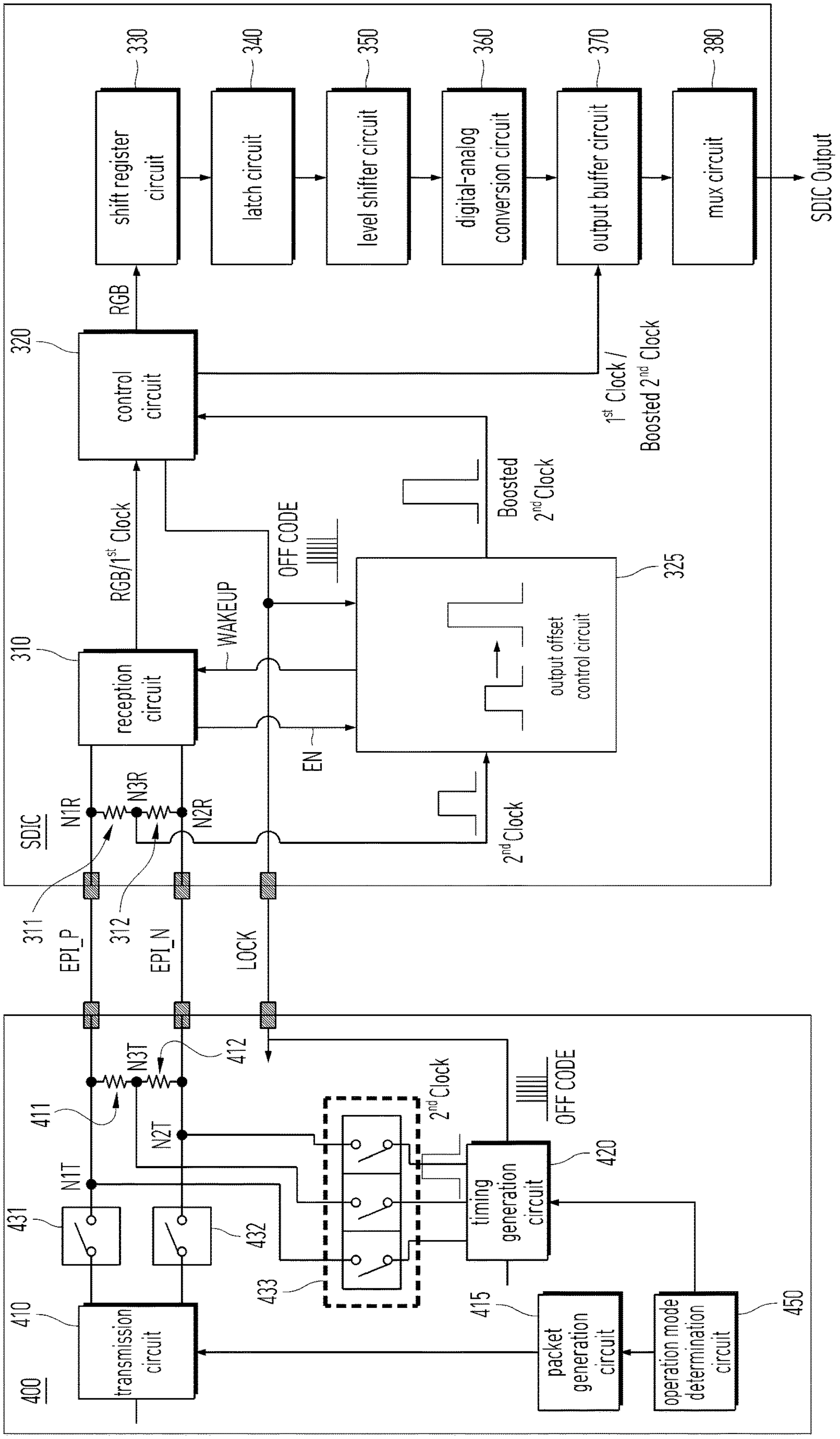
FIG. 5 is a block diagram schematically showing the configuration of a source driver IC and a timing controller according to a second embodiment of the present disclosure.

FIG. 5 is a block diagram schematically showing the configuration of a source driver IC and a timing controller according to a second embodiment of the present invention.

As shown in FIG. 5, a timing controller 400 according to a second embodiment of the present disclosure includes a transmission circuit 410, a packet generation circuit 415, a timing generation circuit 420, a first switching element 431, a second switching element 432, a third switching element 433, and an operation mode determination circuit 450.

The timing controller 400 according to the second embodiment shown in FIG. 5 is similar to the timing controller 400 according to the first embodiment shown in FIG. 2, except for including the first, second, and third switching elements 431, 432, and 433. Accordingly, hereinafter, differenced from the timing controller 400 shown in FIG. 2 will be mainly described.

When an operation mode of the timing controller 400 is determined as a normal mode by the operation mode determination circuit 450, the transmission circuit 410 outputs an input data packet (e.g., a packet according to the EPI system) generated by the packet generation circuit 415 in the form of a differential signal through an EPI interface EPI_P and EPI_N. In this case, for convenience of description, the input data packet transmitted through a first EPI line EPI_P will be referred to as a first EPI signal, and the input data packet transmitted through a second EPI line EPI_N will be referred to as a second EPI signal. The first EPI signal and the second EPI signal have opposite phases.

Specifically, when the first switching element 431 connected to the first EPI line EPI_P is turned on, the transmission circuit 410, which is operating in the normal mode, transmits the first EPI signal to a source driver IC SDIC through the first EPI line EPI_P. In addition, when the second switching element 432 connected to the second EPI line EPI_N is turned on, the second EPI signal is transmitted to the source driver IC SDIC through the second EPI line EPI_N. In this case, the first switching element 431 and the second switching element 432 may be controlled by the operation mode determination circuit 450.

Meanwhile, the transmission circuit 410 is turned off when operating in the low power mode.

When the operation mode of the timing controller 400 and the source driver IC SDIC is determined as the normal mode by the operation mode determination circuit 450, the packet generation circuit 415 generates an input data packet including image data and a first clock signal 1st Clock for the operation of the source driver IC SDIC.

In addition, when the operation mode determination circuit 450 determines that the timing controller 400 and the source driver IC (SDIC) are driven in the low-power mode when the second frame is driven, the packet generation circuit 415 sets a value of an operation mode setting bit included in the input data packet of a first frame to a first value. When the operation mode of a second frame is determined to be driven in the normal mode, the packet generation circuit 415 sets a value of the operation mode setting bit included in the input data of the first frame to a second value.

When the operation mode of the timing controller 400 and the source driver IC SDIC is determined as the low power mode by the operation mode determination circuit 450, the timing generation circuit 420 generates a second clock signal 2nd Clock for output offset cancellation of the source driver IC SDIC and outputs it to the third switching element 433. The second clock signal 2nd Clock may be transmitted to the source driver IC SDIC through the first EPI line EPI_P or the second EPI line EPI_N through the third switching element 433. In this case, the second clock signal 2nd Clock may be generated to have a first voltage level. The first voltage level may be lower than a second voltage level, which is a voltage level required for operation of an internal circuit of the source driver IC SDIC. In this way, if the second clock signal 2nd Clock is transmitted at a low voltage level, noise generated during transmission and reception of the second clock signal 2nd Clock may be reduced.

In one embodiment, when the operation mode is changed from the low power mode to the normal mode by the operation mode determination circuit 450, the timing generation circuit 420 may generate a low power mode off signal OFF CODE indicating the end of the low power mode and transmit it to the source driver IC SDIC through a lock line LOCK.

The first switching element 431 is turned on when operating in the normal mode, is connected to the first EPI line EPI_P, and outputs a first EPI signal of a first phase through the first EPI line EPI_P.

The second switching element 432 is turned on when operating in the normal mode, is connected to the second EPI line EPI_N, and outputs a second EPI signal of a second phase opposite to the first phase through the second EPI line EPI_N.

The third switching element 433 is turned on when operating in the low power mode so that the second clock signal 2nd Clock can be transmitted to the source driver IC SDIC. In one embodiment, the third switching element 433 may include a first switch, a second switch, and a third switch.

The first switch selectively connects the timing generation circuit 420 to a first node NIT to which a first transmission resistor 411 and the first EPI line EPI_P are connected. The second switch selectively connects the timing generation circuit 420 to a second node N2T to which a second transmission resistor 412 and the second EPI line EPI_N are connected. The third switch selectively connects the timing generation circuit 420 to a third node N3T to which the first transmission resistor 411 and the second transmission resistor 412 are connected. Accordingly, the second clock signal 2nd Clock may be outputted to the source driver IC SDIC through any one of the first node NIT, the second node N2T, and the third node N3T.

In FIG. 5, the third switching element 433 includes three switches, but this is only one example, and in another embodiment, the third switching element 433 may include only one switch for connecting the timing generation circuit 420 to any one of the first to third nodes.

In the above embodiment, the first switching element 431 and the second switching element 432 are turned off when operating in the low power mode, and the third switching element 433 is turned off when operating in the normal mode. The operation mode determination circuit 450 controls each of the first to third switching elements 431, 432, and 433 to be turned on/off.

Thus, according to the second embodiment of the present disclosure, unlike the first embodiment, since the timing controller 400 may output the second clock signal 2nd Clock to the source driver IC SDIC through the first EPI line EPI_P and the second EPI line EPI_N, a separate line for transmitting the second clock signal 2nd Clock is not required additionally, and thus the configuration of the display device may be simplified and manufacturing cost may be reduced.

Figure 6:
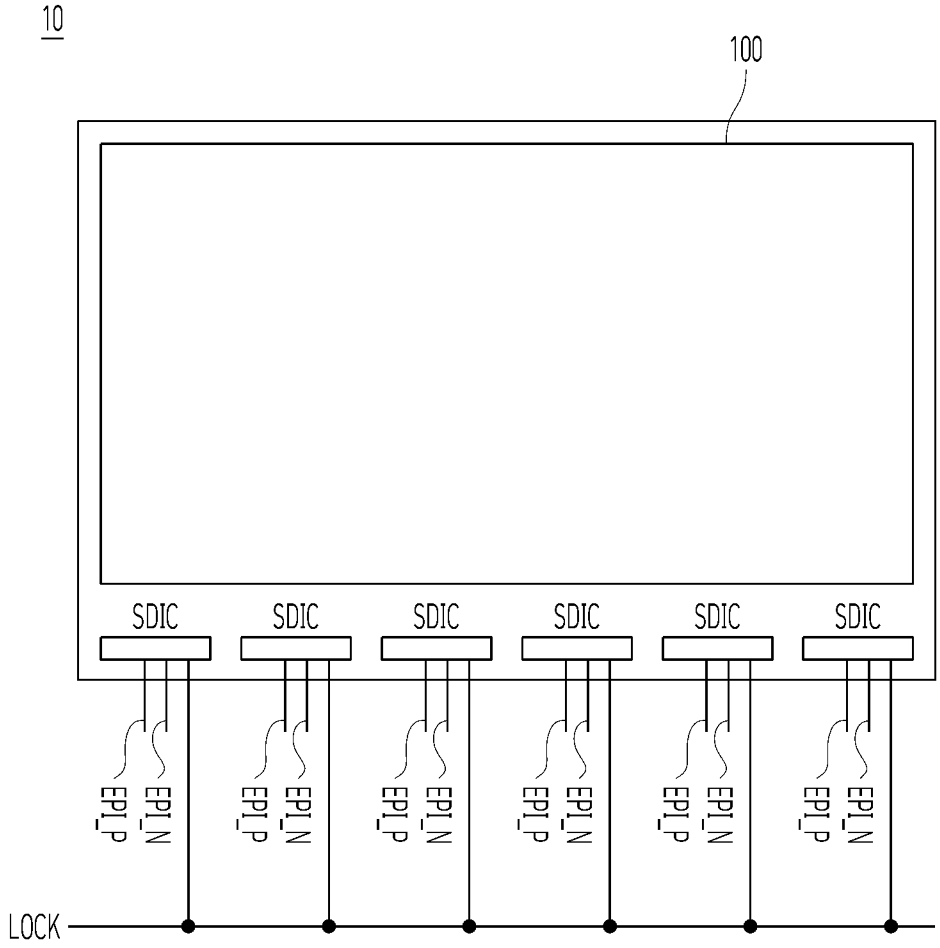
FIG. 6 is a diagram showing an example of an interface line between the source driver IC and the timing controller shown in FIG. 5.

FIG. 6 is a diagram showing an example of interface wiring between the source driver IC and the timing controller shown in FIG. 5.

As shown in FIG. 6, a display device 10 includes a plurality of source driver ICs SDIC, and each of the source driver ICs SDIC is connected to a timing controller (not shown) through a first EPI line EPI_P, a second EPI line EPI_N, and a lock line LOCK.

In this case, unlike the first embodiment, since a second clock signal 2nd Clock is transmitted to the source driver IC SDIC through the first EPI line EPI_P or the second EPI line EPI_N, it can be observed that a separate control line is not required.

Referring back to FIG. 5, a source driver IC SDIC according to the second embodiment of the present disclosure includes a reception circuit 310, a control circuit 320, an output offset control circuit 325, a shift register circuit 330, a latch circuit 340, a level shifter circuit 350, a digital-to-analog conversion circuit 360, an output buffer circuit 370, and a MUX circuit 380.

The source driver IC SDIC according to the second embodiment shown in FIG. 5 is similar to the source driver IC SDIC according to the first embodiment shown in FIG. 2, except that it includes then output offset control circuit 325. Therefore, hereinafter, differences from the source driver IC SDIC shown in FIG. 2 will be mainly described.

Figure 7:
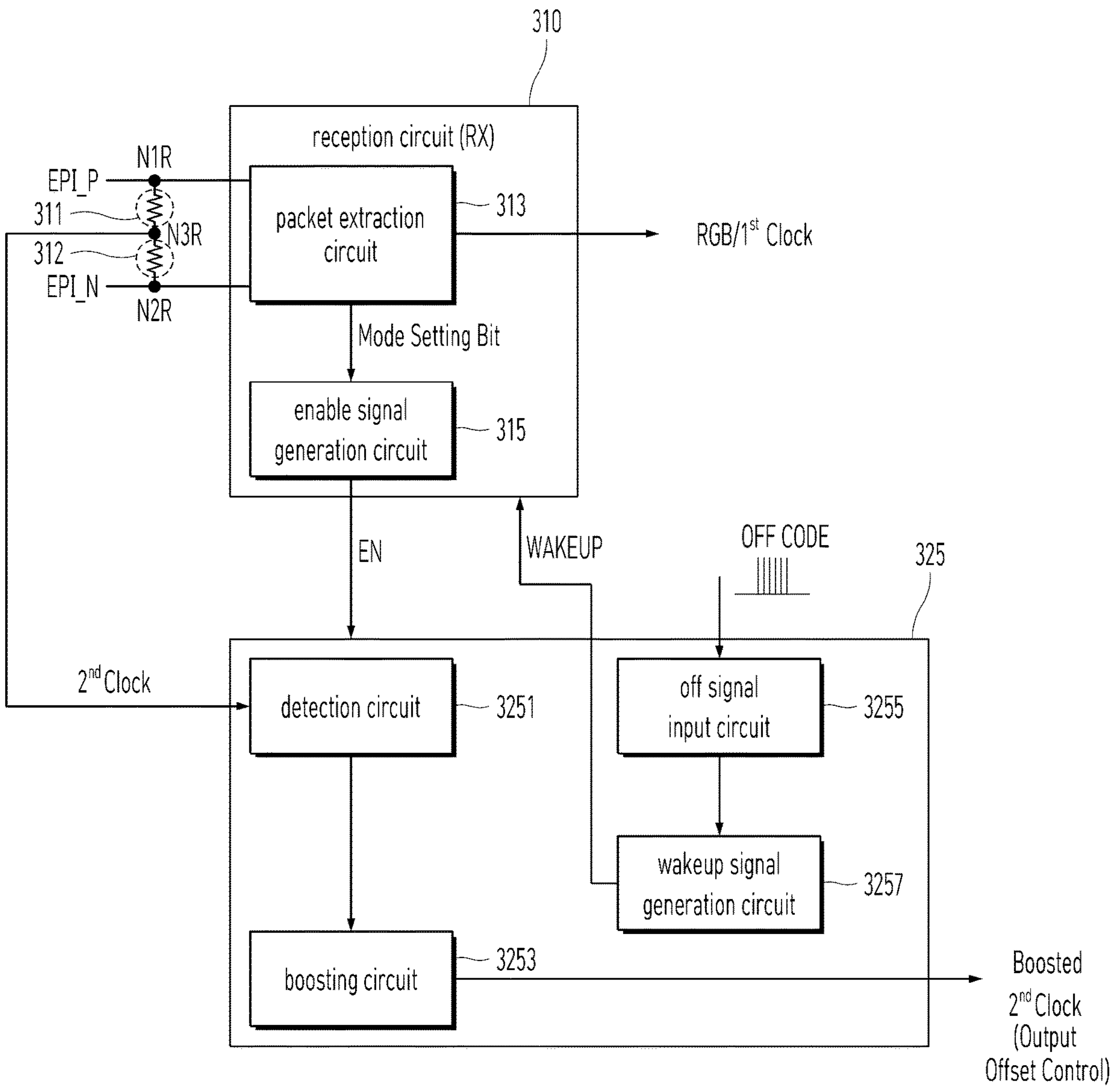
FIG. 7 is a block diagram showing detailed configurations of a receiving circuit and an output offset control circuit shown in FIG. 5.

FIG. 7 is a block diagram showing detailed configurations of the reception circuit and the output offset control circuit shown in FIG. 5.

As shown in FIG. 5 and FIG. 7, the reception circuit 310 included in the source driver IC SDIC includes a packet extraction circuit 313 and an enable signal generation circuit 315.

The packet extraction circuit 313 extracts image data, a first clock signal 1st Clock, and an operation mode setting bit Mode Setting Bit indicating the start of a low power mode from the input data packet.

The enable signal generation circuit 315 decodes the operation mode setting bit Mode Setting Bit to generate and output an enable signal EN for enabling the output offset control circuit 325.

In an embodiment, the enable signal generation circuit 315 may output an enable signal of a first level (for example, a low level), that is, a first enable signal, if it is confirmed that the operation mode setting bit has a first value, and output an enable signal of a second level (for example, a high level), that is, a second enable signal, if it is confirmed that the operation mode setting bit has a second value.

For example, the enable signal generation circuit 315 may output an enable signal EN of a low level L by determining that the operation mode is a low power mode if the operation mode setting bit indicates "0", and may output an enable signal EN of a high level H by determining that the operation mode is a normal mode if the operation mode setting bit indicates "1".

Meanwhile, if the operation mode setting bit obtained from the input data packet of the first frame is the first value when operating in the normal mode, the reception circuit 310 may be turned off by determining that the second frame consecutive to the first frame should operate in the low power mode.

For example, if the operation mode setting bit included in the input data packet for the first frame received when operating in the normal mode indicates "0", the reception circuit 310 determines that the second frame consecutive to the first frame should operate in the low power mode and is turned off when the second frame is driven.

In addition, the reception circuit 310 monitors whether a wake-up signal WAKEUP generated by a wakeup signal generation circuit 3257 described later is received when operating in the low power mode. When the wakeup signal WAKEUP is received, the reception circuit 310 is turned on and operates in the normal mode.

The control circuit 320 receives and outputs image data RGB and a first click signal 1st Clock from the reception circuit 310 when operating in the normal mode, and receives and outputs a second clock signal Boosted 2nd Clock boosted by the boosting circuit 3253 when operating in the low power mode.

When receiving the enable signal of the low level L from the reception circuit 310, the output offset control circuit 325 is enabled and receives the second clock signal 2nd Clock. Then, the output offset control circuit 325 boosts a voltage level of the received second clock signal 2nd Clock and outputs it to the control circuit 320. In one embodiment, the output offset control circuit 325 may be disabled when the enable signal EN of the high level H is received or a low power mode off signal OFF CODE is received.

The output offset control circuit 325 includes a detection circuit 3251, a boosting circuit 3253, an off-signal input circuit 3255, and the wakeup signal generation circuit 3257.

The detection circuit 3251 detects whether the second clock signal 2nd Clock is received from the timing controller 400. In one embodiment, the detection circuit 3251 may detect the second clock signal 2nd Clock through any one of a first node N1R to which a first reception resistor 311 and a first EPI line EPI_P are connected, a second node N2R to which a second reception resistor 312 and a second EPI line EPI_N are connected, and a third node N3R to which the first reception resistor 311 and the second reception resistor 312 are connected.

When the second clock signal 2nd Clock is detected through any one of the first to third nodes N1R, N2R, and N3R, the detection circuit 3251 transmits the second clock signal 2nd Clock to the boosting circuit 3253.

The boosting circuit 3253 boosts the second clock signal 2nd Clock of a first voltage level into a second clock signal Boosted 2nd Clock of a second voltage level higher than the first voltage level.

For example, when a second clock signal 2nd Clock having a voltage level of 0.4V to 0.8V is detected by the detection circuit 321, the boosting circuit 3253 may boost the detected second clock signal 2nd Clock to a second clock signal Boosted 2nd Clock having a power supply voltage level VCC on the system, e.g., a voltage level of 1.8V.

The off-signal input circuit 3255 receives a low power mode off signal OFF CODE from the timing controller 400 indicating the end of the low power mode through the lock line LOCK.

When the low power mode off signal OFF CODE is received through the off signal input circuit 3255, the wakeup signal generation circuit 3257 generates a wakeup signal WAKEUP for entering the normal mode and outputs it to the reception circuit 310. This is because it is necessary to turn on the reception circuit 310 in advance just before switching from the low power mode to the normal mode because the reception circuit 310 remains turned off during the low power mode period and is unable to receive an input data packet including an operation mode setting bit that indicates the switching to the normal mode. To this end, the source driver IC SDIC according to the present disclosure may receive the low power mode off signal OFF CODE through the lock line and turn on the reception circuit 310 by a wakeup signal generated using the low power mode off signal OFF CODE.

Figure 8:
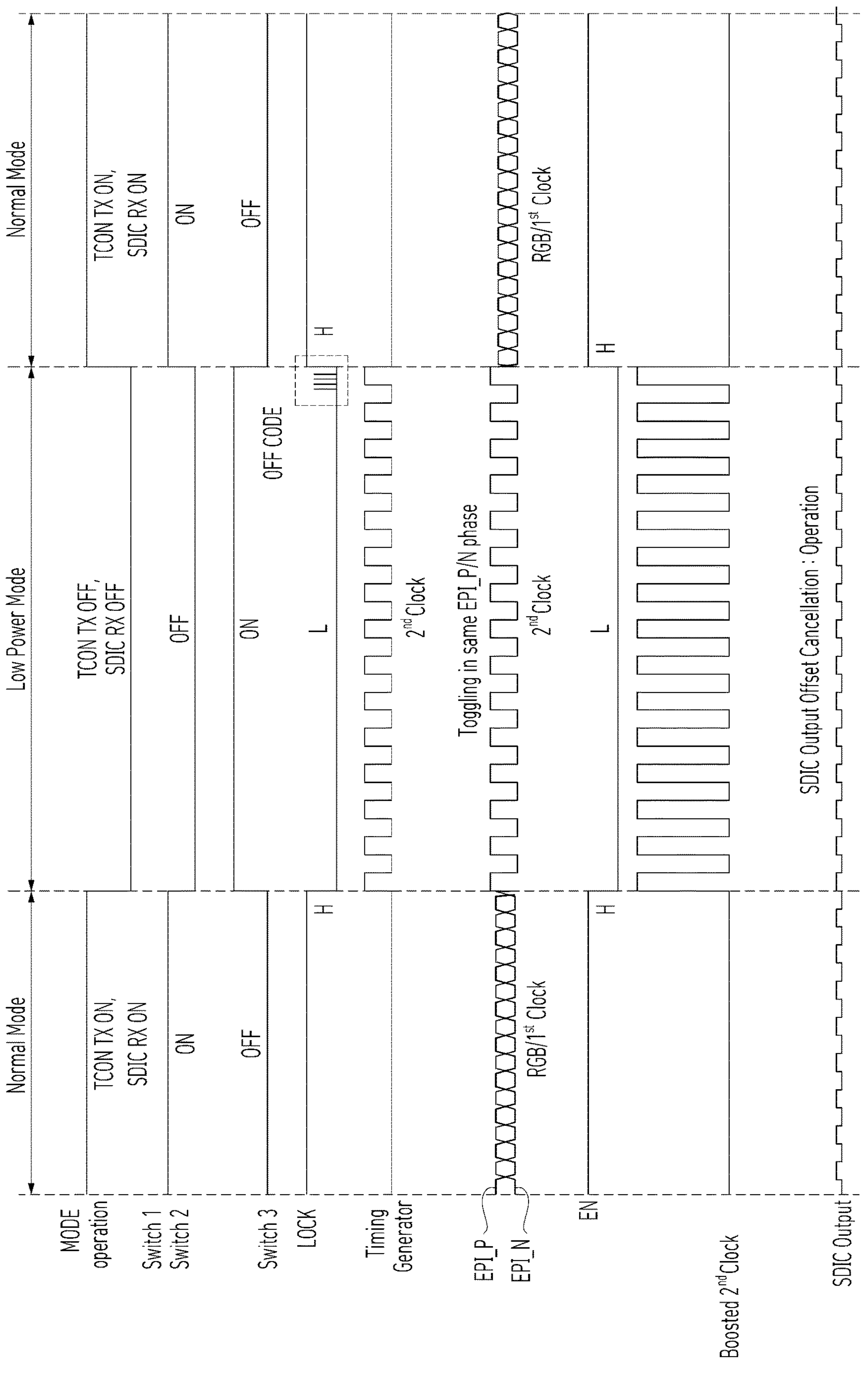
FIG. 8 is a timing diagram to describe operations of the source driver IC and the timing controller shown in FIG. 5 and FIG. 7.

FIG. 8 is a timing diagram to describe operations of the source driver IC and the timing controller shown in FIG. 5 and FIG. 7.

As shown in FIG. 8, the source driver IC SDIC and the timing controller 400 according to the second embodiment of the present disclosure may operate in any one of a normal mode and a low power mode. Hereinafter, a time interval in which the timing controller operates in the normal mode will be referred to as a normal mode interval, and a time interval in which the timing controller operates in the low power mode will be referred to as a low power mode interval.

During the normal mode interval, the transmission circuit TX of the timing controller TCON and the reception circuit RX of the source driver IC SDIC are turned on, and the timing generation circuit Timing Generator does not output a second clock signal 2nd Clock.

In addition, the first and second switching elements are turned on during the normal mode interval by a first control signal Switch 1 and a second control signal Switch 2 that control the turn-on/off of each of the switching elements, and the third switching element is turned off by a third control signal Switch 3 that controls the turn-on/off of the corresponding switching element.

In addition, image data RGB and a first clock signal 1st Clock may be transmitted in opposite phases through the first EPI line EPI_P and the second EPI line EPI_N. In addition, it may be seen that, while an output SDIC Output of the source driver IC SDIC is toggled according to the first clock signal 1st Clock, an output offset cancellation operation SDIC Output Offset Cancellation of the source driver IC (SDIC) is performed.

If an operation mode setting bit Mode Setting Bit included in an input data packet of a first frame received in the normal mode interval corresponds to a value of “0”, the reception circuit RX of the source driver IC (SDIC) enters the low power mode and is turned off when a second frame consecutive to the first frame is driven.

Accordingly, during the low power mode interval, both the transmission circuit TX of the timing controller TCON and the reception circuit RX of the source driver IC SDIC are turned off. In addition, during the low power mode interval, the first and second switching elements of the timing controller TCON are turned off by the first control signal Switch 1 and the second control signal Switch 2, and the third switching element is turned on by the third control signal Switch 3. Accordingly, the timing generation circuit Timing Generator outputs the second clock signal 2nd Clock to the source driver IC SDIC through the first EPI wire EPI_P and the second EPI wire EPI_N. In this case, the second clock signal 2nd Clock may be generated to have a first voltage level.

In addition, during the low power mode interval, the output offset control circuit of the source driver IC SDIC is enabled by an enable signal EN of a low level L to detect the second clock signal 2nd Clock having the first voltage level, and boosts the voltage level of the detected second clock signal 2nd Clock to a second voltage level to generate a boosted second clock signal Boosted 2nd Clock. Subsequently, as the boosted second clock signal Boosted 2nd Clock is provided to the output buffer circuit, the output SDIC Output of the source driver IC SDIC is toggled by the boosted second clock signal Boosted 2nd Clock, and thus the output offset cancellation operation SDIC Output Offset Cancellation of the source driver IC SDIC is performed.

During the low power mode interval, the reception circuit RX of the source driver IC SDIC is turned off and is unable to receive the input data packet, so the reception circuit RX needs to be turned on before switching to the normal mode. Accordingly, the timing controller TCON generates a low power mode off signal OFF CODE to indicate the entry into the normal mode and transmits it to the source driver IC SDIC through the lock line. When the low power mode off signal OFF CODE is received from the timing controller TCON, the output offset control circuit generates a wakeup signal for turning on the reception circuit RX and transmits it to the reception circuit RX.

Hereinafter, a method of driving a source driver IC according to the present disclosure will be described with reference to FIG. 9.

Figure 9:
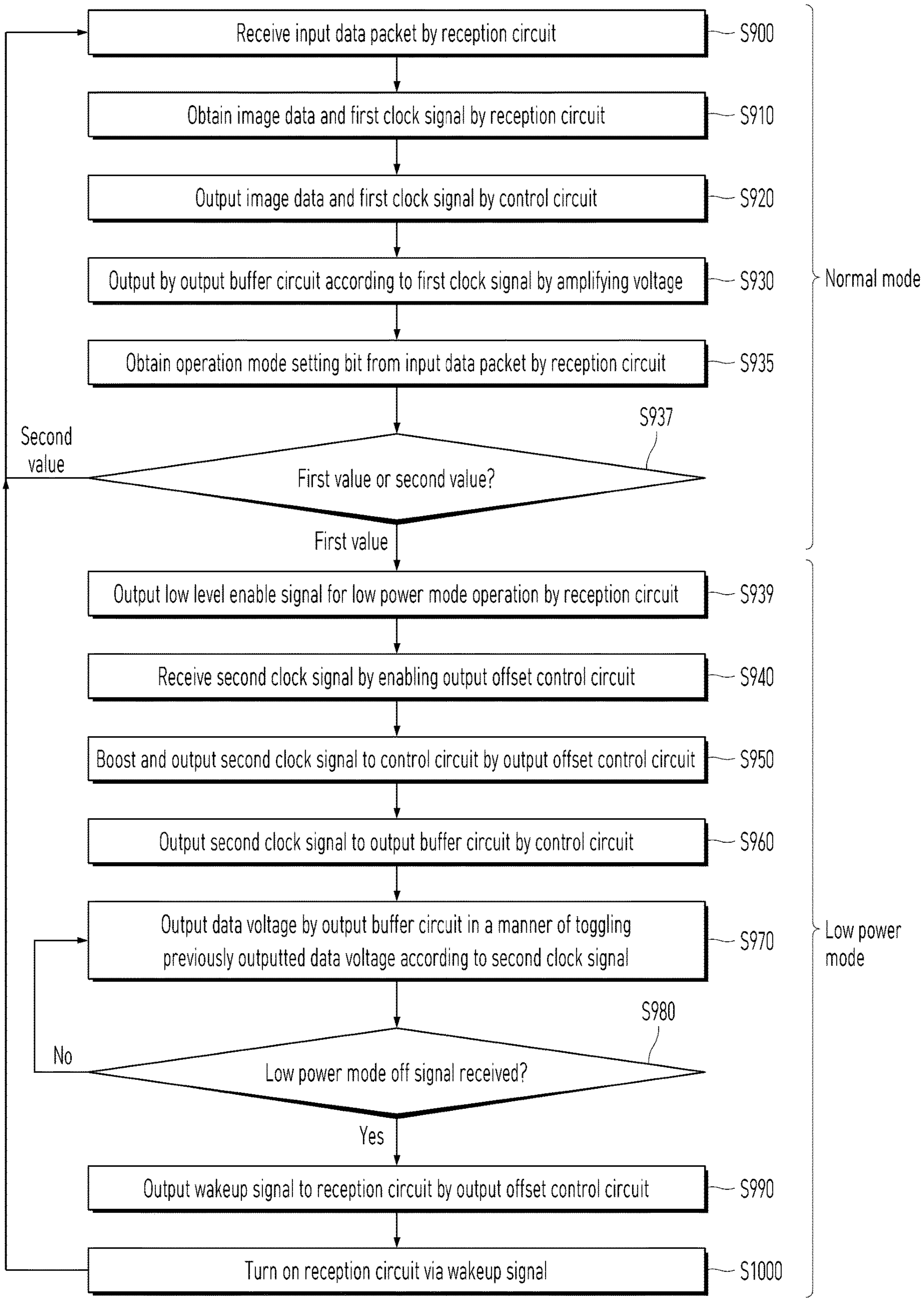
FIG. 9 is a flowchart showing a method of driving a source driver IC according to one embodiment of the present disclosure.

FIG. 9 is a flowchart showing a source driver IC driving method according to one embodiment of the present disclosure.

First, during a normal mode interval, a reception circuit receives an input data packet from a timing controller (S900), and obtains image data and a first clock signal from the input data packet (S910). In one embodiment, the reception circuit may receive the input data packet from the timing controller through an EPI-type interface including a first EPI line and a second EPI line.

Thereafter, during the normal mode interval, a control circuit receives and outputs the image data and the first clock signal from the reception circuit (S920).

Thereafter, during the normal mode interval, an output buffer circuit amplifies a data voltage corresponding to the image data and outputs the amplified data voltage according to a first clock signal (S930). In this way, during the normal mode interval, the output buffer circuit may output a data voltage toggled according to the first clock signal transmitted along with the image data, so that an output offset of the output buffer circuit may be cancelled.

Meanwhile, during the normal mode interval, the reception circuit obtains an operation mode setting bit from the input data packet received in S910 (S935), decodes the obtained operation mode setting bit to confirm a value of the operation mode setting bit (S937). If it is confirmed that the operation mode setting bit has a second value, the reception circuit determines that it should operate in the normal mode when a next frame is driven. If determining that it should operate in the normal mode, the reception circuit repeats the steps after S910.

On the other hand, when it is confirmed that the operation mode setting bit has a first value, the reception circuit determines that it should operate in a low power mode while driving a next frame, generates an enable signal of a low level to operate in the low power mode and outputs it to an output offset control circuit, and the reception circuit is turned off (S937).

Thereafter, the output offset control circuit is enabled by an enable signal and receives a second clock signal from the timing controller (S940). In one embodiment, the output offset control circuit may monitor any one of a first node to which a first reception resistor and a first EPI line are connected, a second node to which a second reception resistor and a second EPI line are connected, and a third node to which the first reception resistor and the second reception resistor are connected, as shown in FIG. 5, thereby receiving a second clock signal having a first voltage level from the corresponding node.

Subsequently, the output offset control circuit boosts the second clock signal having the first voltage level into a second clock signal having a second voltage level, and then outputs the boosted second clock signal to the control circuit (S950).

Then, during the low power mode interval, the control circuit outputs the second clock signal to an output buffer circuit (S960), and the output buffer circuit outputs a data voltage being outputted in the previous frame while toggling it according to the second clock signal (S970). In this way, during the low power mode interval, the output buffer circuit may output the data voltage toggled according to the second clock signal transmitted separately, so that the output offset of the output buffer circuit may be cancelled.

Thereafter, during the low power mode interval, if receiving a low power mode off signal indicating the end of the low power mode from the timing controller (S980), the output offset control circuit determines that it should operate in the normal mode when driving a next frame, generates a wakeup signal for entering the normal mode, and outputs it to the reception circuit (S990). In one embodiment, the output offset control circuit may receive a low power mode off signal from the timing controller through a lock line for transmitting a lock signal indicating completion of obtaining the first clock signal.

Subsequently, the reception circuit is turned on by the wakeup signal received from the output offset control circuit (S1000) and performs a process after the step S900, thereby resuming the operation in the normal mode.

Meanwhile, in the above-described embodiment, the source driver IC is described as receiving the second clock signal from the timing controller using the separate output offset control circuit. However, in another embodiment, the source driver IC may receive the second clock signal from the timing controller through a separate additional line without the need for the output offset control circuit. In this case, the source driver IC may directly receive the second clock signal having the second voltage level, thereby skipping the step of boosting the second clock signal.

It will be appreciated by those skilled in the art to which the present disclosure belongs that the disclosure described above may be practiced in other specific forms without altering its technical ideas or essential features.

In addition, the methods described herein may be implemented using one or more computer programs or components, at least in part. These components may be provided as a series of computer instructions through computer-readable or machine-readable media containing volatile and nonvolatile memory. The instructions may be provided as software or firmware, and may be implemented in hardware configurations such as ASICs, FPGAs, DSPs, or other similar devices in whole or in part. The instructions may be configured to be executed by one or more processors or other hardware configurations, and the processor(s) or other hardware configurations perform all or some of the methods and procedures disclosed in the present specification or enable them to be performed when executing a series of the computer instructions.

It should therefore be understood that the embodiments described above are exemplary and non-limiting in all respects. The scope of the present disclosure is defined by the appended claims, rather than by the detailed description above, and should be construed to cover all modifications or variations derived from the meaning and scope of the appended claims and the equivalents thereof.

What is claimed is:

1. A source driver Integrated Circuit (IC), comprising:

a reception circuit configured to receive an input data packet from a timing controller when operating in a normal mode and obtain an image data and a first clock signal from the input data packet;

a control circuit configured to receive and output the image data and the first clock signal from the reception circuit when operating in the normal mode, the control circuit configured to receive and output a second clock signal from the timing controller when operating in a low power mode; and an output buffer circuit configured to output a data voltage related to the image data when operating in the normal mode and maintain an output of the data voltage when operating in the low power mode, wherein the output buffer circuit is configured to output the data voltage according to the first clock signal when operating in the normal mode and output the data voltage according to the second clock signal when operating in the low power mode.

2. The source driver IC of claim 1, further comprising an output offset control circuit configured to receive the second clock signal from the timing controller by being enabled when operating in the low power mode and boost to output a voltage level of the received second clock signal to the control circuit, wherein the reception circuit comprises an enable signal generation circuit configured to generate an enable signal for enabling the output offset control circuit by decoding an operation mode setting bit included in the input data packet to indicate a start of the low power mode and output the enable signal to the output offset control circuit.

3. The source driver IC of claim 2, wherein the reception circuit receives the input data packet from the timing controller through an interface of an EPI type including a first Embedded clock Point-to-point Interface (EPI) line and a second EPI line and wherein the output offset control circuit comprises a detection circuit detecting the second clock signal through any one of a first node having a first reception resistor and the first EPI line connected thereto, a second node having a second reception resistor and the second EPI line connected thereto, and a third node having the first reception resistor and the second reception resistor connected thereto and a boosting circuit boosting the second clock signal having a first voltage level to the second clock signal having a second voltage level higher than the first voltage level.

4. The source driver IC of claim 2, wherein the enable signal generation circuit outputs a first enable signal based on receiving the operation mode setting bit having a first value and a second enable signal based on receiving the operation mode setting bit having a second value and wherein the output offset control circuit is enabled by the first enable signal and disabled by the second enable signal.

5. The source driver IC of claim 2, wherein based on obtaining the operation mode setting bit having a first value from the input data packet of a first frame when operating in the normal mode, the reception circuit operates in the low power mode by being turned off when driving a second frame consecutive to the first frame.

6. The source driver IC of claim 2, wherein the output offset control circuit comprising:

an off signal input circuit receiving a low power mode off signal indicating an end of the low power mode from the timing controller; and a wakeup signal generation circuit generating a wakeup signal for entry into the normal mode based on receiving the low power mode off signal and outputting the wakeup signal to the reception circuit, wherein the reception circuit operates in the normal mode by being turned on by the wakeup signal.

7. The source driver IC of claim 6, wherein the off signal input circuit receives the low power mode off signal from the timing controller through a lock line for transmission of a lock signal indicating obtainment completion of the first clock signal.

8. The source driver IC of claim 1, further comprising a pin having the second clock signal with a second voltage level inputted thereto, wherein the control circuit receives the second clock signal through the pin when operating in the low power mode and outputs the received second clock signal to the output buffer circuit.

9. A timing controller, comprising:

a transmission circuit configured to output an input data packet including an image data and a first clock signal to a source driver Integrated Circuit (IC) through an interface of a predetermined type when operating in a normal mode and be turned off when operating in a low power mode; and a timing generation circuit configured to generate and output a second clock signal to the source driver IC when operating in the low power mode.

10. The timing controller of claim 9, further comprising:

a packet generation circuit generating the input data packet; and an operation mode determination circuit configured to compare a first image data of a first frame with a second image data of a second frame consecutive to the first frame and determine to operate the source driver IC in the low power mode when driving the second frame based on the first image data and the second image data identical to each other, wherein based on determining an operation mode of the source driver IC as the low power mode, an operation mode setting bit for operating the source driver IC in the low power mode is included in the input data packet for the first frame by the packet generation circuit.

11. The timing controller of claim 10, wherein the operation mode determination circuit compares the second image data of the second frame with a third image data of a third frame consecutive to the second frame based on operating the source driver IC in the low power mode when driving the second frame and determines to operate the source driver IC in the normal mode when driving the third frame based on the second image data and the third image data different from each other and wherein the timing generation circuit generates and transmits a low power mode off signal indicating an end of the low power mode to the source driver IC through a lock line.

12. The timing controller of claim 9, wherein the transmission circuit and a reception circuit of the source driver IC are connected together through an interface of an EPI type including a first EPI line and a second EPI line and wherein the timing controller further comprises a first switching element configured to connect any one of a first node having a first transmission resistor and the first EPI line connected thereto, a second node having a second transmission resistor and the second EPI line connected thereto, and a third node having the first transmission resistor and the second transmission resistor connected thereto to the timing generation circuit by being turned on when operating in the low power mode and output the second clock signal to any one of the first node, the second node, and the third node.

13. The timing controller of claim 12, further comprising:

a second switching element configured to be connected to the first EPI line by being turned on when operating in the normal mode and output a first EPI signal of a first phase through the first EPI line; and a third switching element configured to be connected to the second EPI line by being turned on when operating in the normal mode and output a second EPI signal of a second phase opposite to the first phase through the second EPI line.

14. A method of driving a source driver Integrated Circuit (IC), the method comprising:

receiving an input data packet from a timing controller and obtaining an image data and a first clock signal from the input data packet by a reception circuit during a normal mode interval;

receiving and outputting the image data and the first clock signal from the reception circuit by a control circuit during the normal mode interval;

amplifying and outputting a data voltage related to the image data by an output buffer circuit according to the first clock signal during the normal mode interval;

receiving and outputting a second clock signal from the timing controller by the control circuit during a low power mode interval; and outputting the data voltage used to be outputted along with the first clock signal by the output buffer circuit according to the second clock signal during the low power mode interval.

15. The method of claim 14, further comprising:

before the receiving and outputting the second clock signal, decoding an operation mode setting bit included in the input data packet to indicate a start of the low power mode by an enable signal generation circuit during the normal mode interval and outputting a first enable signal based on confirming that the operation mode setting bit has a first value;

receiving the second clock signal from the timing controller by an output offset control circuit enabled by the first enable signal; and boosting and outputting a voltage level of the second clock signal to the control circuit by the output offset control circuit.

16. The method of claim 15, wherein in the obtaining the first clock signal, the reception circuit receives the input data packet from the timing controller through an interface of an EPI type including a first Embedded clock Point-to-point Interface (EPI) line and a second EPI line, wherein in the receiving the second clock signal, the output offset control circuit receives the second clock signal having a first voltage level through any one of a first node having a first reception resistor and the first EPI line connected thereto, a second node having a second reception resistor and the second EPI line connected thereto, and a third node having the first reception resistor and the second reception resistor connected thereto, and wherein in the outputting, the output offset control circuit boosts the second clock signal having the first voltage level to the second clock signal having a second voltage level higher than the first voltage level and outputs the boosted second clock signal to the control circuit.

17. The method of claim 15, wherein in the outputting the first enable signal, based on confirming that the operation mode setting bit included in the input data packet for a first frame has the first value, the reception circuit operates in the low power mode by being turned off when driving a second frame consecutive to the first frame.

18. The method of claim 14, further comprising:

during the low power mode interval, generating and outputting a wakeup signal for entry into the normal mode to the reception circuit by the output offset control circuit based on receiving a low power mode off signal indicating an end of the low power mode from the timing controller; and operating in the normal mode by the reception circuit turned on by the wakeup signal.

19. The method of claim 18, wherein the output offset control circuit receives the low power mode off signal from the timing controller through a lock line for transmission of a lock signal indicating obtainment completion of the first clock signal.

20. The method of claim 14, wherein in the receiving and outputting the second clock signal, the control circuit directly receives the second clock signal having a second voltage level from the timing controller.

* * * * *